United States Patent Office 2,910,361
Patented Oct. 27, 1959

2,910,361

ANIMAL FEED

Eric C. Kunz, Arden, N.C.

No Drawing. Original application March 15, 1953, Serial No. 342,269. Divided and this application April 3, 1959, Serial No. 803,832

1 Claim. (Cl. 99—6)

The present invention relates to a new and improved method of feeding ruminants, disclosed in my prior application Serial No. 342,269, filed March 15, 1953, of which this application is a division.

Heretofore some attention has been given to providing nitrogen-containing feed supplements to be added to grain feedstuffs. This feed supplement has been used in an attempt to make up the protein deficiency of the grain itself. No known attempt has been made heretofore, however, to replace the grain diet completely with urea as a protein source and molasses.

It is therefore the primary object of this invention to provide a method of feeding ruminants involving the use of a grainless feed mixture consisting essentially of urea and molasses.

A further object of the present invention is to provide for feeding of ruminants at a greatly reduced cost. This cost saving is brought about by the fact that molasses can be obtained at a price far below the price of grain feeds.

Animals, provided with a rumen, commonly called ruminants, have the ability to synthesize valuable proteins of a digestible nature in their stomachs from urea. This transformation of urea is done only by ruminants and is called a constructive synthesis.

To secure this concentration, the urea is uniformly and intimately mixed with appropriate amounts of a molasses. I can use molasses of any type such as Florida citrus molasses, Mississippi cane molasses, or wood molasses, with the first of these being preferred because of its present ready availability and low cost.

I have found that a mixture of 100 parts of molasses to not more than 5 parts of urea, and preferably 3 to 4 parts of urea, produces a feed high in protein and other nutritional value and is very compatible. These mixtures can be diluted if so desired with a suitable diluent such as water to form a free-flowing liquid of any consistency. Such a mixture can be stored without spoilage for a year or more even in presence of a considerable amount of water.

Whereas my new animal food product is essentially a mixture of molasses, urea and water, I do not limit my invention to this mixture.

For instance, I have found this new product a convenient vehicle for any or all necessary trace minerals which have been found to be so highly beneficial when added to the animal feed. Examples of such minerals are iron citrate, maganese sulphate, copper sulphate, cobalt carbonate, and potassium iodide.

The following examples illustrate the preparation of my new feed. It should be understood, however, that these examples are illustrative only and that satisfactory products can be produced from other molasses type materials and the mixtures can be varied according to the above description.

*Example I*

In a vat of 1000 gallons size, provided with a suitable agitator, I dissolve in 600 pounds of water 150 to 200 pounds of urea by good agitation at normal room temperature. When all the urea is dissolved I add slowly 5000 pounds of molasses under constant agitation until the watery solution of urea is intimately and uniformly mixed with the molasses and forms a free-flowing liquid. Samples can be drawn and analyzed to assure a uniform mixture.

*Example II*

In a vat of 1000 gallons capacity, provided with a suitable agitator, I dissolve in 600 pounds of water 150 to 200 pounds of urea, 15 pounds of citrate of iron, 6 pounds of manganese sulphate, 3 pounds of copper sulphate, half a pound of cobalt carbonate and less than $\frac{1}{10}$ of a pound of potassium iodide under constant agitation until a solution and/or suspension is accomplished. To this mixture I add 5000 pounds of molasses and proceed as in Example I.

Either of the products of the foregoing examples may be fed to ruminants as a replacement for the usual grain diet as hereinbefore indicated, with satisfactory results.

Having thus described the invention, what is claimed as new and desired to be secured by Letters Patent is:

A method which comprises feeding to ruminants, as a total replacement for a grain diet, a completed liquid food composition consisting essentially of an intimate mixture of urea and molasses, the amount of urea being about 3% to 4% by weight of the molasses, said composition being free of natural grain feeds.

References Cited in the file of this patent

UNITED STATES PATENTS

| | | |
|---|---|---|
| 2,560,830 | Turner | July 17, 1951 |
| 2,569,282 | Block | Sept. 25, 1951 |
| 2,603,567 | Stiles | July 15, 1952 |

OTHER REFERENCES

Peterson: Molkerei, Ztg. 1 (1947), 119–20 cited in C.A. 44 (1950), 3630 f.

Tillman et al.: Journal Animal Science, vol. 10. No. 1951, pp. 939–946.